Sept. 29, 1925.

J. H. CHEETHAM

PACKLESS VALVE

Filed Feb. 18, 1924

1,555,552

Inventor
Joseph H. Cheetham

Attorneys

Patented Sept. 29, 1925.

1,555,552

UNITED STATES PATENT OFFICE.

JOSEPH H. CHEETHAM, OF DETROIT, MICHIGAN, ASSIGNOR OF ONE-HALF TO ELWOOD C. JOHNSTON, OF DETROIT, MICHIGAN.

PACKLESS VALVE.

Application filed February 18, 1924. Serial No. 693,611.

*To all whom it may concern:*

Be it known that I, JOSEPH H. CHEETHAM, a citizen of the United States of America, residing at Detroit, in the county of Wayne and State of Michigan, have invented certain new and useful Improvements in Packless Valves, of which the following is a specification, reference being had therein to the accompanying drawing.

This invention relates to valves and relates particularly to valves eliminating necessity for packing.

It is an object of the invention to provide a valve, preferably of a packless type, in which the number of parts will be less, and their arrangement more compact, as compared to prior practice, thus simplifying the assembly, and permitting use of a smaller and lighter bonnet member, whereby an economy of material results.

The invention consists in the structural features and arrangement of parts hereinafter set forth.

In the drawing:—

Figure 1:
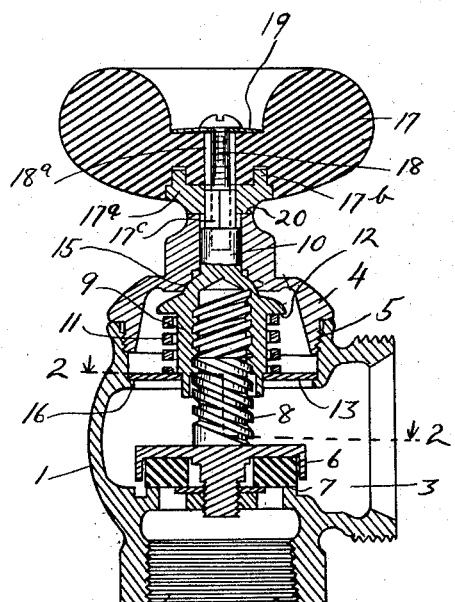
Figure 1 is a view of the improved valve in sectional elevation.
Figure 2:
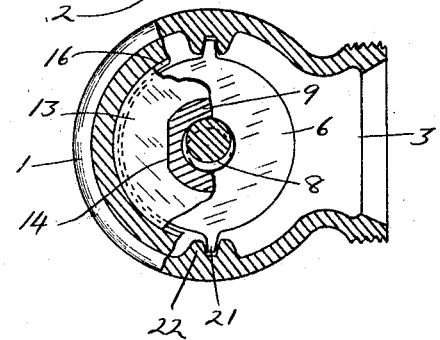
Figure 2 is a cross section of the same taken on line 2—2 of Figure 1.

In the construction shown in Figures 1 and 2, the reference character 1 designates the valve casing which is formed with inlet and outlet openings 2 and 3, which may have any desired relation, but are shown as relatively transverse. Said casing has the usual bonnet portion 4 which is screw threaded, or otherwise secured, to the main body of the casing as indicated at 5, this bonnet member being separable, primarily to permit insertion of the valve member 6, into the casing, and its removal therefrom. Said member engages a seat 7 marginal to the opening 2 and has a screw 8 projecting axially therefrom toward the bonnet member 4, said screw being integral with the valve member in the illustrated embodiment of the device. 9 is a nut engaging said screw and carried integrally by a stem 10 which is journaled centrally in the bonnet member 4. 11 is a spring compressed between an annular shoulder 12 upon said nut and a plate 13 rotative in unison with the nut but freely slidable upon the latter. To thus connect said plate to the nut the latter is formed upon its end adjacent the valve member with a cylindrical seat having the opposite portions 14 planed off, the plate 13 having a correspondingly shaped opening to engage said seat. The spring 11 establishes a seal between the stem 10 and the bonnet member 4 by yieldably holding a spherically rounded annular shoulder 15 formed upon the stem at its juncture with the nut 9 with a complementary concave annular seat provided interiorly of said bonnet member. The plate 13 marginally seats upon an annular flange 16 formed interiorly of the casing 1.

17 is a handle which is attached by a screw 18 to an end portion of the stem 10 projecting out of the bonnet member 4. Said handle, which may be of any suitable material and shape, has inserted in its under-face a metal hub $17^a$ having projections $17^b$ engaging in sockets of the handle proper to form a drive connection. Said hub has a squared axial opening, which slidably receives the squared end $17^c$ of the stem. The screw 18 passes freely through an axial opening $18^a$ in the handle, and a leaf spring 19 is compressed between the head of said screw and the handle. Said spring yieldingly seats the hub member $17^a$ of the handle upon the end face 20 of the bonnet member 4, taking up any play between the handle and said end face that might otherwise result from wear either between the hub member $17^a$ and the bonnet end face 20 or between the sealing shoulder 15 and its seat. 21 designates lugs oppositely formed upon the valve member 6 and engaging between ribs 22 upon the casing to restrain said valve member from rotation during its opening or closing movement.

From the preceding description, the operation of the described valve will be evident. The spring 11 forces the annular shoulder 15 of the stem to its seat within the bonnet member 4 under pressure sufficient to establish a positive seal against leakage without offering undue frictional resistance to actuation of said stem. When said stem and the nut 9 integral therewith are turned, the screw 8, since it and the valve member 6 are non-rotative, is fed axially of said nut to seat or unseat said valve member, according to the direction of turning of the stem. Any pressure axially applied to the handle may not act to overcome compression of the spring 11, since the drive connection between handle and stem (established by sliding engagement of squared end 17ᶜ of the stem in correspondingly shaped opening of the hub 17ᵃ) will not transmit an axial thrust.

The avoidance of relative motion between the spring 11 and either end abutment thereof is a feature of the invention. Such relative motion is objectionable, since it creates a tendency for the end of the spring to cut into its abutment or to buckle.

What I claim as my invention is:

1. A valve comprising a casing, a valve member therein, an actuating stem for said valve member having an annular sealing shoulder seating upon the casing, a spring between said shoulder and the valve member and urging said shoulder to its seat upon the casing, abutments for said spring, both non-rotative relative thereto in the normal operation of the valve transmitting the thrust of the spring respectively to the casing and to said stem, and a handle slidably engaging said stem and held seated upon said casing.

2. A valve comprising a casing, a valve member therein, an actuating stem for said valve member having an annular sealing shoulder seating upon the casing, a nut carried by the stem, a screw carried by the valve member and engaging said nut, an abutment upon the end of said nut adjacent said annular shoulder, a spring coiled around the nut and having one end engaging said abutment, and an abutment for the other end of the spring slidable upon the other end of the nut and rotatable in unison with the nut and seated upon the casing.

3. In a valve, a casing comprising a ported body and a bonnet member detachably secured to said body, a valve member controlling the port of said body, an actuating stem for said valve member having an annular sealing shoulder seating upon the bonnet member, a spring disposed substantially in its entirety within the body and acting upon the stem, urging said annular shoulder thereof to its seat upon the bonnet member, an abutment for said spring seating upon said body, means independent of said abutment engaging said valve member with the casing and restraining said member from rotation, and a handle for said stem, seating exteriorly upon said bonnet member.

4. A valve comprising a casing, a valve member therein, an actuating stem for said valve member having an annular sealing shoulder seating upon the casing, a spring between said shoulder and the valve member and urging said shoulder to its seat upon the casing, abutments for said spring, both non-rotative relative thereto and to the stem in the normal operation of the valve for transmitting the thrust of the spring respectively to the casing and to said stem, and a handle slidably engaging said stem and held seated upon said casing.

In testimony whereof I affix my signature.

JOSEPH H. CHEETHAM.